United States Patent
Malhotra et al.

(10) Patent No.: US 9,613,228 B2
(45) Date of Patent: *Apr. 4, 2017

(54) ISOLATION AND PRESENTATION OF UNTRUSTED DATA

(71) Applicant: Microsoft Technology Licensing, LLC, Redmond, WA (US)

(72) Inventors: Vikas Malhotra, Snoqualamie, WA (US); Benjamin E. Canning, Seattle, WA (US); Daniel B. Jump, Redmond, WA (US); David C LeBlanc, Monroe, WA (US); Benjamen E. Ross, Seattle, WA (US); James Campbell, Seattle, WA (US); Brian Carver, Kirkland, WA (US); Joshua Pollock, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/661,789

(22) Filed: Mar. 18, 2015

(65) Prior Publication Data
US 2015/0347771 A1    Dec. 3, 2015

Related U.S. Application Data

(63) Continuation of application No. 12/607,074, filed on Oct. 28, 2009, now Pat. No. 9,003,517.

(51) Int. Cl.
G06F 12/14    (2006.01)
H04L 29/06    (2006.01)
(Continued)

(52) U.S. Cl.
CPC ............ *G06F 21/629* (2013.01); *G06F 21/53* (2013.01); *G06F 21/566* (2013.01); *G06F 21/604* (2013.01)

(58) Field of Classification Search
CPC ...... G06F 21/629; G06F 21/604; G06F 21/53; G06F 21/566
(Continued)

(56) References Cited

U.S. PATENT DOCUMENTS 7,490,109 B1    2/2009  Sikchi et al.
8,082,239 B2 *  12/2011 Yang ................. G06F 17/30592
                                                          707/600
(Continued)

OTHER PUBLICATIONS

Jain, et al., "Application-Level Isolation and Recovery with Solitude", Retrieved at <<http://www.eecg.toronto.edu/~ashvin/publications/solitude-eurosys.pdf>>,EuroSys'08, Apr. 1-4, 2008, vol. 42, Issue 4., 13 pages.
(Continued)

*Primary Examiner* — Aravind Moorthy
(74) *Attorney, Agent, or Firm* — Newport IP, LLC; Scott Y. Shigeta

(57) ABSTRACT

Architecture that provides a secure environment in which data (e.g., code, instructions, files, images, etc.) can be opened and run by a client application. Once opened the data can be viewed (in a "protected view") by the user without incurring risk to other client processing and systems. Accordingly, the architecture mitigates malicious attacks by enabling users to preview untrusted and potentially harmful data (e.g., files) in a low risk manner. Files opened in the protected view are isolated from accessing key resources on the client computer and provides the user a safer way to read files that can contain dangerous content. The protected view also provides a seamless user experience. The user is
(Continued)

unaware that the client is operating on data in a different mode and allows for the reduction of security prompts.

23 Claims, 9 Drawing Sheets

(51) Int. Cl.
  *H04L 9/32* (2006.01)
  *G06F 11/30* (2006.01)
  *G06F 21/62* (2013.01)
  *G06F 21/60* (2013.01)
  *G06F 21/53* (2013.01)
  *G06F 21/56* (2013.01)

(58) Field of Classification Search
  USPC .............. 726/29, 22, 24; 713/165, 168, 188
  See application file for complete search history.

(56) References Cited

U.S. PATENT DOCUMENTS

| 9,003,517 | B2* | 4/2015 | Malhotra | ............... G06F 21/53 |
| | | | | 713/165 |

| 2002/0019941 | A1 | 2/2002 | Chan et al. |
| 2003/0028655 | A1 | 2/2003 | Owhadi |
| 2004/0006706 | A1 | 1/2004 | Erlingsson |
| 2005/0149726 | A1 | 7/2005 | Joshi et al. |
| 2007/0118900 | A1 | 5/2007 | Focke et al. |
| 2007/0136810 | A1 | 6/2007 | Waltermann et al. |
| 2007/0180449 | A1 | 8/2007 | Croft et al. |
| 2007/0180509 | A1 | 8/2007 | Swartz et al. |
| 2007/0204259 | A1 | 8/2007 | Wilner et al. |
| 2008/0313648 | A1 | 12/2008 | Wang et al. |
| 2011/0047613 | A1 | 2/2011 | Walsh |

OTHER PUBLICATIONS

Potter, et al., "Secure Isolation of Untrusted Legacy Applications", Retrieved at <<http://www.usenix.org/events/lisa07/tech/full_papers/potter/potter.pdf>>, In the proceedings of the 21st conference on Large Installation System Administration Conference, 2007, 14 pages.

* cited by examiner

ISOLATION AND PRESENTATION OF UNTRUSTED DATA

CROSS-REFERENCE TO RELATED APPLICATION

This application is a continuation of U.S. patent application Ser. No. 12/607,074 filed Oct. 28, 2009, titled "ISOLATION AND PRESENTATION OF UNTRUSTED DATA", the entire disclosure and contents of which are hereby incorporated by reference herein.

BACKGROUND

Software is a ubiquitous component employed for both business and personal purposes. While providing a great benefit, this widespread use also provides a means for introducing unauthorized (or untrusted) code or other types of data into computing systems for insidious purposes. Moreover, despite the threat of unauthorized data, authorized data may be provided for download that can introduce unintended consequences. For example, the authorized data may not have been tested for all or a major set of possible uses, thereby causing errors or failures in the user system.

In a more specific instance, the data can be a file that the user receives in or as an attachment to an email message, or the user accesses via a network or a database. Existing systems can flag such files as potentially malicious files, and then notify the user of this potential. However, it can be the case that the file is not malicious. The user is not offered a way to view the file to make an overriding determination that the file is not malicious and should be received.

One existing approach to address mitigate problem is called file block. The IT administrator can designate certain file formats to be allowed to be opened by an application and other formats to be blocked from opening. However, again, the user can be inundated with alert dialogues that cannot be properly addressed without viewing the file (or data).

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a secure environment ("sandbox") in which data (e.g., code, instructions, files, images, etc.) can be opened by a client application. Moreover, once opened the data can be viewed (a "protected view") by the user without incurring risk to other client processes and systems. In other words, the architecture mitigates malicious attacks by enabling users to preview untrusted and potentially harmful data (e.g., files) in a low risk manner Files opened in the protected view are isolated from accessing key resources on the client computer and provides the user a safer way to read files that can contain dangerous content (malware). The protected view also provides a seamless user experience in that the user is unaware that the client is operating on data in a secure mode and thereby allows for the reduction of security prompts the user would otherwise be forced to deal with in existing implementations.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
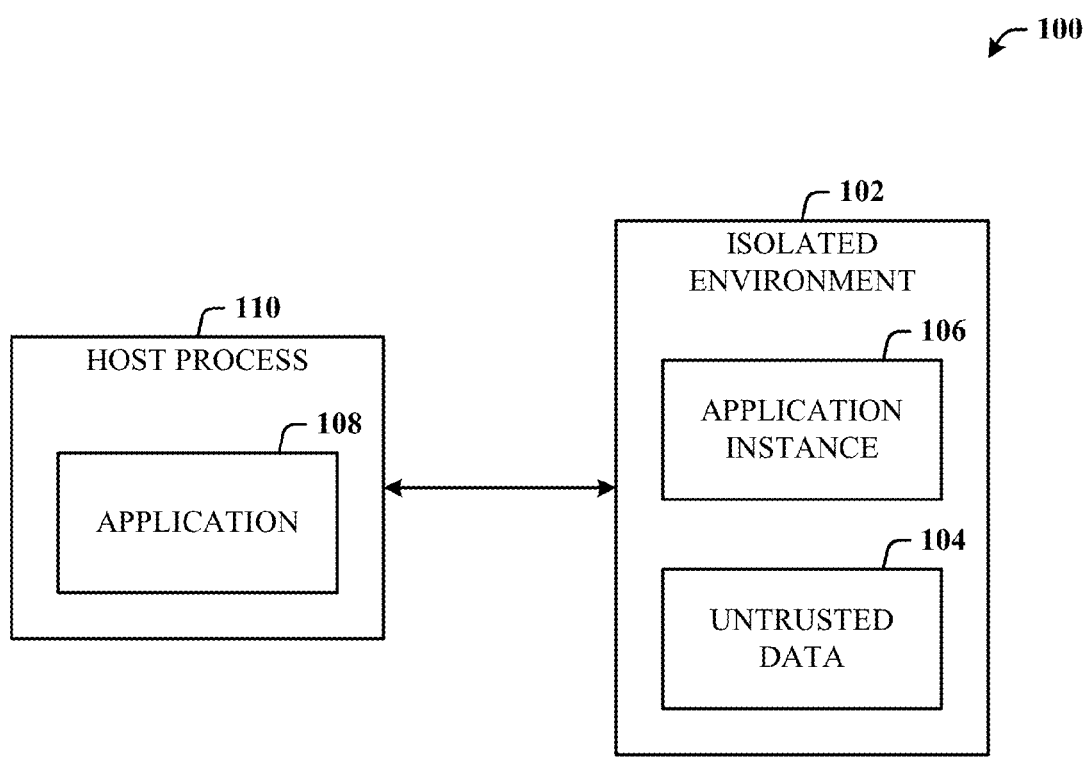
FIG. 1 illustrates a computer-implemented system for handling data in accordance with the disclosed architecture.

The disclosed architecture provides a secure data handling mechanism where untrusted data (e.g., files, code, instructions, programs, media, attachments, etc.) is isolated in a sandbox environment for safe processing until such time as the data is deemed trusted or is to be discarded. In accordance therewith, the architecture provides a protected view of the untrusted data allows user interaction with the untrusted data in a low risk manner. Data opened in protected view is isolated from accessing key resources on the user computer and provides them a safer way to read files that can contain dangerous content. The protected view can be presented concurrently with a normal view of trusted data. The protected view is graphically enhanced to distinguish the protected view from the normal view. The architecture operates in a seamless way such that the user is unaware of operating in a different mode that allows for the reduction of security prompts.

In other words, the "seamless" architecture allows the user to view documents in a protected view without having to be aware of the background processes that make this occur. The view appears to the user like a regular document opened in, for example, a word processor (and in many respects behaves like a regular document), and the user is unaware that there are actually two instances of the word processing application: one instance in a secure ("sandbox") environment that communicates with another over a communications pipe in the host environment.

Additionally, since the protected view makes parsing/rendering of the content safer, the number of annoying prompting dialogs such as "are you sure?" can be reduced in number. These dialogs formerly stood between the user and the content and in many cases provided no real security value, since users got so accustomed to blindly clicking "OK".

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 for handling data in accordance with the disclosed architecture. The system 100 includes an isolated environment 102 (sandbox) created to process untrusted data 104 using an application instance 106 of an application 108 to execute the untrusted data 104. The untrusted data 104 can be received from data sources designated as untrusted and/or of file formats designated as untrusted. Untrusted data sources can include the Internet, download folders that received data from the Internet or other networks, file formats known to be associated with malware, a file that can include attachments or embedded media or objects, and so on. The system 100 also includes a host process 110 that interactively communicates with the isolated environment 102 based in part on interaction with the untrusted data 104.

The isolated environment 102 and the host process 110 can be client-based. Alternatively, the isolated environment 102 is client-based, and the host process 110 is based remotely from the client system such as on a server or another client. Still alternatively, the host process 100 can be local and the isolated environment 102 can be remotely based, for example, on a separate desktop, separate window station, or separate physical machine. Each step away from the host process 110 provides a greater ability to restrict the sandbox environment. Yet another alternative embodiment employs sandbox environments across local and remote locations.

The host process 110 operates on the assumption that the code in the isolated environment has been compromised by malware, and treats all messages emanating therefrom as potentially malicious. The host process 110 only performs operations that are guaranteed to be safe, regardless of the source; otherwise, the host process 110 prompts the user for permission before proceeding. Thus, the host process 110 only processes trustworthy messages. The untrusted data 104 can be processed using the application instance 106 without confirmation dialogs presented to a user of the host process 110. Alternatively, however, there are times when the host process 110 will display a confirmation dialog. For example, when a user selects ("clicks") a hyperlink in the document, the click is received by the application instance 106 in the isolated environment 102. In order to act on the click (e.g., by launching a web browser), the application instance 106 asks the host process 110 to act on its behalf. When the host process 110 receives the "please follow this hyperlink" message generated in response to the click, the host process 110 requests the user's permission, since following an arbitrary and potentially maliciously constructed hyperlink is deemed not safe.

The host process 110 functions as a privileged entity and performs privileged operations of the client system, and moreover, the host process 110 monitors health of the isolated environment 102 and restarts the isolated environment 102 due to a failure associated with the isolated environment 102.

The application 108 (and hence, application instance 106) can be part of an application suite that provide a word processing application, spreadsheet application, presentation application, and so on. As described in FIG. 2, a protected view is introduced, which is a sandbox environment that helps mitigate malicious code attacks by enabling users to preview and interact with untrusted or potentially harmful files in a low risk manner. Data (e.g., files, code, instructions, etc.) opened in protected view is isolated from accessing key resources on the user computer and provides the user a safer way to read data files that can contain dangerous content.

The protected view also provides a seamless user experience—seamless in the sense that the look-and-feel is as if it is part of the regular application functionality. The user is unaware that the client application is operating in an isolated mode as well, since the user is no longer prompted to confirm choices. This isolated operation allows for the reduction of security prompts (also referred to as confirmation dialogs). The user is able to make trusted decisions. An alternative, inferior (less seamless) implementation can require the opening of an untrusted document in a different application (e.g., launch "protected view word processor" rather than the word processor from a Start menu).

The protected view architecture includes the host process 110, which can be configured to operate as a privileged entity and a client process (also referred to as the isolated "sandboxed" environment 102) where data (e.g., code) can run freely. Client messages from the isolated environment 102 are authenticated to ensure that only trustworthy messages (communications) are processed, the messages related to the host process 110 and the isolated environment 102.

The protected view architecture provides resiliency to the client system from bad or misbehaving data by monitoring the health of the client processes. In the event the client process (e.g., isolated environment 102) is no longer responding, the host process 110 terminates the client process, restarts the client process, and provides the user the option to reload the failed files.

Not that although described herein as the application instance 106 being a copy of the application 108, this is not a requirement. For example, application 108 can be an email (messaging) application, whereas the application instance 106 can be a word processor application, and the application combination is used to safely preview word processor attachments in an email message. It is within contemplation that an application framework is provided where sandbox applications are registered with the host application 108, such that the host application 108 can load any number of these applications in the sandbox, using a pre-defined communications protocol and set of messages (e.g., over a named pipe).

For example, an application developer can develop an attachment previewer for application file formats, and then register it with an email application. The email application can then load that previewer in the sandbox to securely preview those particular file formats. These are basically variants of the system 400 of FIG. 4, having one host application that launches numerous instances of other applications in the sandbox.

In one implementation, the host process 110 can intercept all user actions prior to sending the user actions to the sandboxed process (the application instance 106). This allows the host process 110 to fully authenticate all user actions, and not those actions in the host process area.

Figure 2:
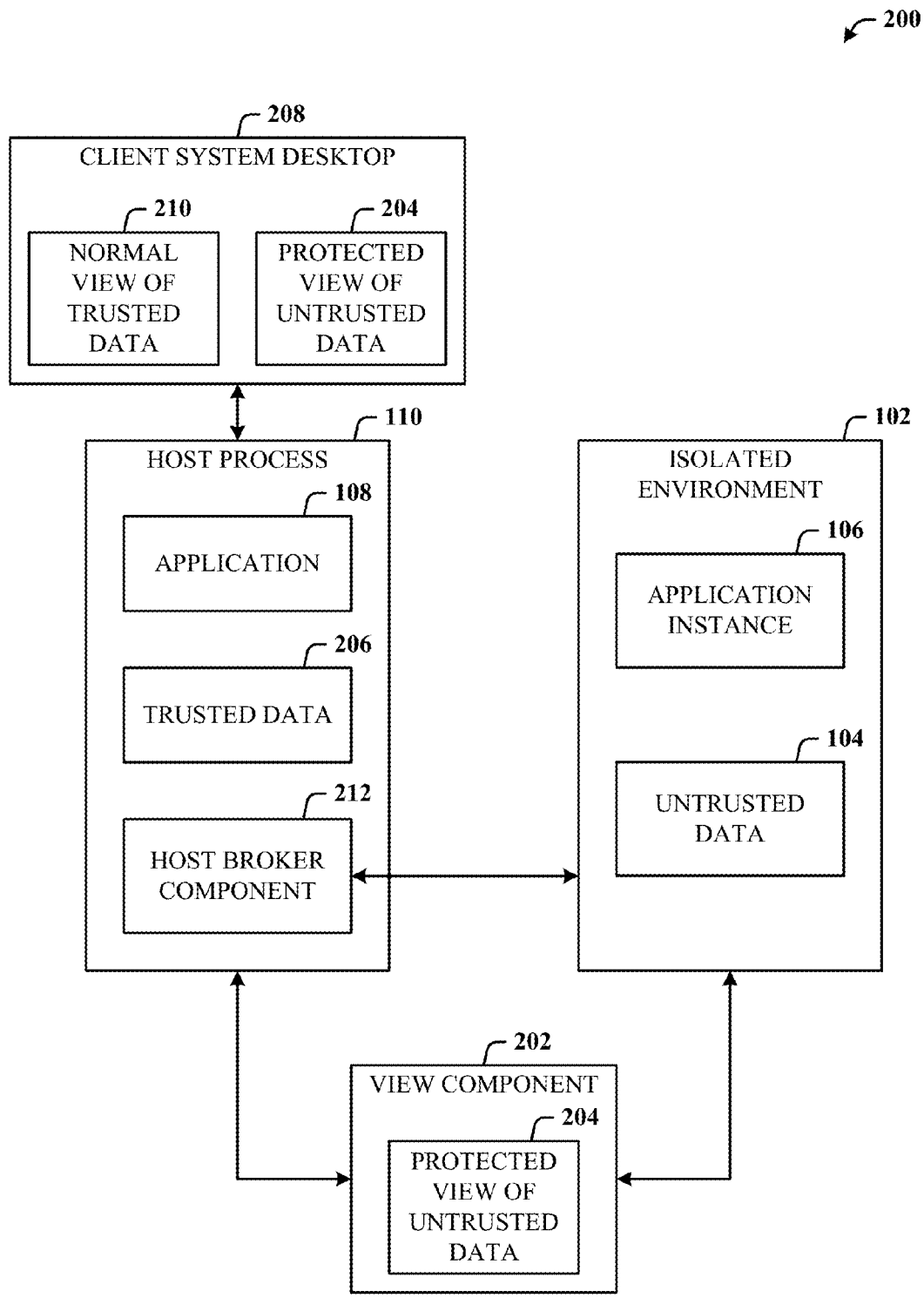
FIG. 2 illustrates an alternative embodiment of a system for handling and viewing data.

FIG. 2 illustrates an alternative embodiment of a system 200 for handling and viewing data. The system 200 includes the components and entities of the system 100 of FIG. 1, as well as other components and entities such as a view component 202. The view component 202 provides a protected view 204 of the untrusted data being processed in the isolated environment 102. Trusted data 206 is run in the host process 110 using the application 108. The host process 110 interfaces to a client system desktop 208, which is a graphical environment that functions as the central user interface to client processes and programs. The trusted data 206 (presented as a normal view 210) and the untrusted data 104 (presented in the protected view 204) can be presented on the client system desktop 208, but more beneficially, as part of a single application or process. The protected view 204 is made graphically distinguishable from the normal view 210 to disambiguate data presentation to the client user. In other words, the user can view both the trusted data 206 and the untrusted data 104, concurrently, as if part of a single application or process.

The system 200 can also include a host broker component 212 that functions to handle communications between the host process 110 and the isolated environment 102 (e.g., an isolated client process).

Put another way, the system 200 can include the isolated client process (the isolated environment 102) without access to client system resources created for processing the untrusted data 104 using the application instance 106 of the application 108 to process the untrusted data 104. The system 200 can also include the host process, with access to the client system resources, which communicates with the isolated client process using request/response communications. The view component 202 facilitates viewing of the untrusted data 104 being processed in the isolated client process.

The host broker component 212 routes communications between the host process 110 and the isolated client process. The application instance 106 and application 108 are one of a word processor program, spreadsheet program, or presentation program, for example, or applications of an office suite of applications.

The view component 202 presents the untrusted data in the protected view 204 that is made graphically distinguishable from the normal view 210 of the trusted data 206. The normal view 210 and the protected view 204 can be presented as if part of a single application and/or on the client desktop 208.

The host process 110 authenticates messages from the isolated client process and processes only trustworthy messages. This authentication can be performed by the host process 110, by the host broker component 212, or via a combination of the host process 110 and the host broker component 212. The host process 110 can be configured to act as a privileged process to authenticate all client messages and perform only the trustworthy messages. The host process 110 performs privileged operations (e.g., access to system resources, obtaining user passwords, etc.). A compromise in the host process 110 can result in a compromise in the entire architecture.

The host process 110 can determine the health of the client processes (e.g., isolated environment 102). In the event a client process is no longer responding the host process 110 can terminate the client process, restart the client process, and provide the user options to reload the failed files.

As previously indicated, the isolated client process is where the untrusted data executes. The isolated client process can contain one or more instances of a dangerous application. Malware or bad code is expected to run freely within the isolated client process and is not able to harm the end-user data. This client-side isolation limits access by the untrusted data to key operating system resources. The key operating system resources can include, but are not limited to, files, registry keys, user interface components (e.g., windows) owned by other processes, named kernel objects (e.g., pipes, shared memory, etc.), and so on. In a more robust implementation, the key resources can include things such as network sockets as well.

The disclosed architecture provides an extensibility model where application developers can write code to be aware of the isolation processing and data handling and build custom solutions that perform correctly in this isolated environment. To the end user it will appear the end user is using one application when in fact parts of the user interface are running in the host process and other parts are running in the isolated client process. Accordingly, when gestures are performed that are part of the host process user interface, the user no longer needs to be prompted with confirmation dialogs since there is a high assurance that the gestures came from the user and not malicious code running with in the client sandbox environment. Files that have been deemed restricted or appear unsafe can now be opened in this new architecture, where in the past, these files would be blocked from being opened with a security prompt.

Figure 3:
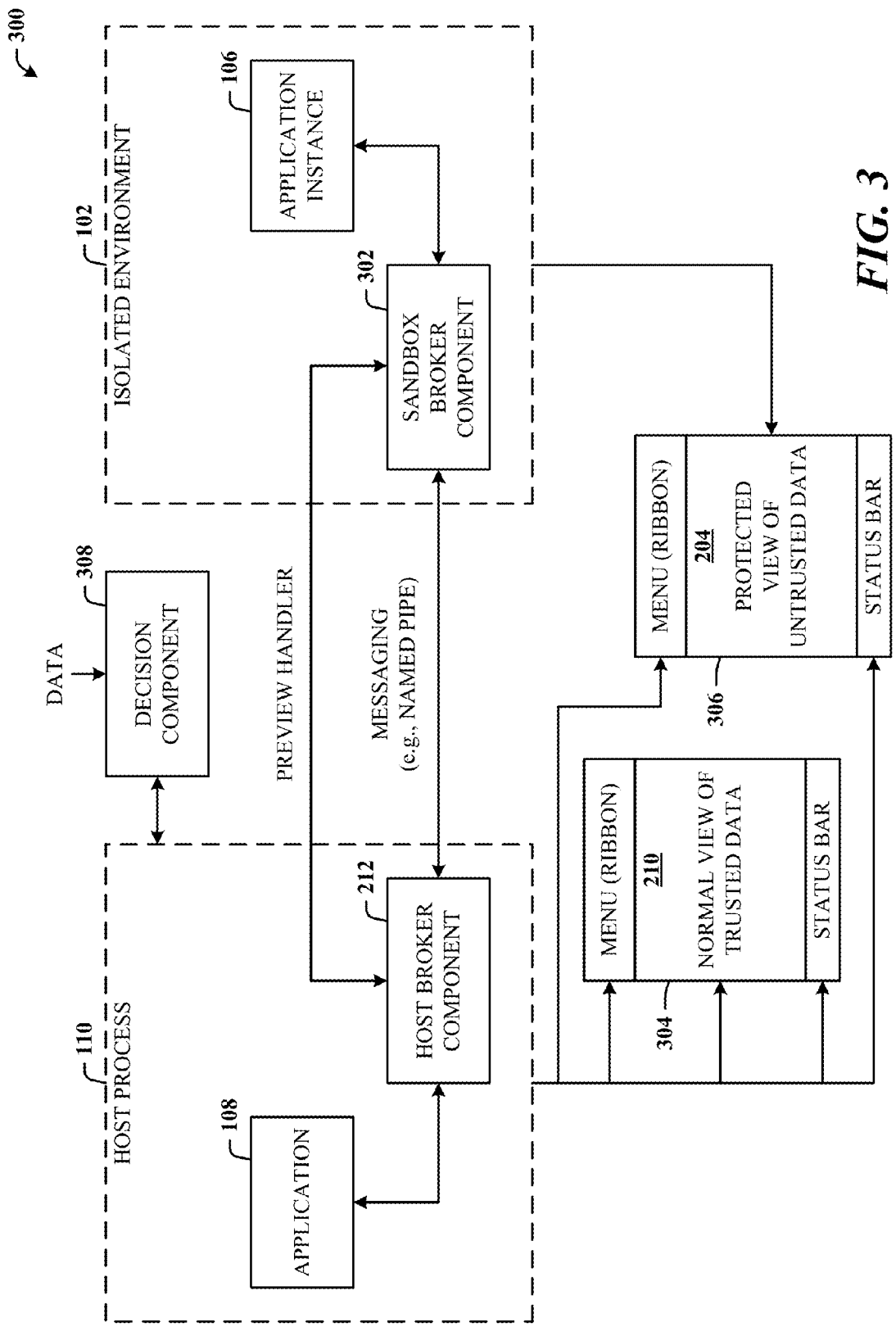
FIG. 3 illustrates an alternative embodiment of a data handling system in accordance with the disclosed architecture.

FIG. 3 illustrates an alternative embodiment of a data handling system 300 in accordance with the disclosed architecture. The system 300 includes the isolated environment 102 created for processing untrusted data using an application instance 106 of the host application 108, the host process 110, and associated host broker component 212. In this embodiment, the isolated environment 102 also includes a sandbox broker component 302 for directly interfacing to the host broker component 212 to handle messaging (communications) between the host process 110 and isolated environment 102, such as via a named pipe. The messaging handled by the broker components (212 and 302) can also include the communications of a preview handler between the host application 108 and application instance 106. Note that where the isolated environment 102 does not include the sandbox broker component 302, the host broker component 212 can process the preview handler messages directly from the application instance 106.

The system 300 also depicts two windows: a first host window 304 for viewing the normal view 210 of the trusted data, and a second host window 306 for viewing the protected view 204 of the untrusted data. The first host window 304 shows a menu system and status bar. Similarly, the second host window 306 shows the same menu system and status bar. The menu systems and status bars are the same because the host application 108 and the application instance 106 are the same. It is to be understood that these are just a few examples of the many possible functional and graphical similarities that can occur between the application window since the settings of the host application 108 are duplicated when creating the application instance 106.

As shown, the host application 108 handles all processes for presenting the normal view of the trusted data, menu/status bar, etc., in the first host window 304, and the menu/status bar, etc., in the second host window 306. However, the application instance 106 of the isolated environment 102 presents the protected view of the untrusted data in the second host window 306. The host application 108 provides distinguishing emphasis to the second host window 306 to clearly distinguish visually the normal view 210 from the protected view 204.

The capabilities and features provided by a fully functional application (e.g., the host application 108) can be restricted for the application instance 106 in the isolated environment 102. For example, the user is allowed to interact with the untrusted data (e.g., a document) using some capabilities provided when in read-only mode such as scroll, search, resize columns, zoom in and out, etc.

The system 300 can also include a decision component 308 that receives data and then determines if the data is trusted or untrusted, and whether the data will be processed in protected view (data is deemed risky) or normal view (data is deemed safe). The result of this determination is then passed to the host process 110. The criteria for determination can be based on the source of the data (e.g., email attachments from outside the user organization or files downloaded from the Internet can be deemed risky, but files located in a folder designated as "trusted" can be deemed to be safe), and if the data format is tagged by a system administrator as being risky (e.g., the code that parses earlier version of word processor documents can reasonably be considered to be less secure than the code that parses a more recent version of word processor documents).

Additionally, other criteria can include whether the data fails some kind of "schema" check (e.g., appears corrupted or otherwise invalid), and whether the user has already chosen to edit the data in the past (e.g., if the user chose to leave protected view once, same data will not be sent back to protected view the next time). Still other factors can include the results of a virus scan of the data, the data is associated with some kind of social mechanism (e.g., other users said this data was risky, so the data is deemed risky in this instance), whether the data is digitally signed, and whether the certificate is trustworthy. These are only a few examples of the criteria that can be employed and is not to be construed as so limiting.

Figure 4:
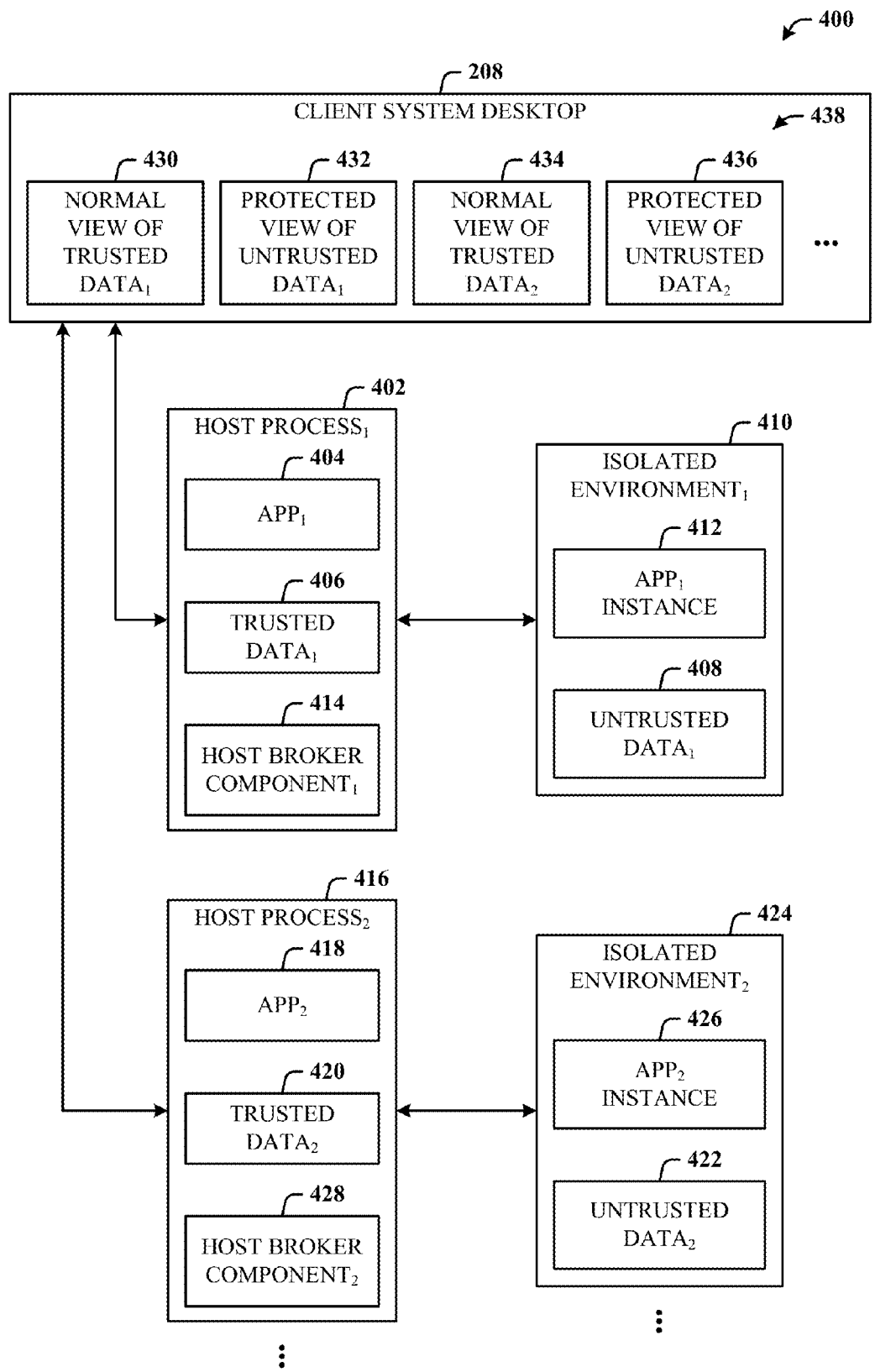
FIG. 4 illustrates an alternative embodiment of a data handling system where a single host process creates multiple separate sandbox environments for untrusted data processing and viewing.

FIG. 4 illustrates an alternative embodiment of a data handling system 400 where a single host process creates multiple separate sandbox environments for untrusted data processing and viewing. Here, a first host process 402 is associated with a first host application 404 (e.g., a word processing program) that operates on first trusted data 406. If first untrusted data 408 is received by the first host process 402, an associated first isolated environment 410 is automatically created in which to process the first untrusted data 408. Additionally, a first application instance 412 is automatically created (by a duplication component, for creating a copy of the first host application 404 and its associated settings) and employed in the first isolated environment 410.

The first host process 402 is also associated with a first host broker component 414 that facilitates the communication of specific messages between the first host process 402 and the first isolated environment 410. The first broker component 414 provides communications isolation between potential malware associated with the first untrusted data 408 of the first isolated environment 410 and operations of the first host process 402. Message authentication can be performed by the first broker component 414 to ensure that only trustworthy messaging will be processed by the first host process 402.

A second host process 416 is associated with a second host application 418 (e.g., a spreadsheet program) that operates on second trusted data 420. If second untrusted data 422 is received by the second host process 416, an associated second isolated environment 424 is automatically created in which to process the second untrusted data 422. Additionally, a second application instance 426 is automatically created (by a duplication component, which can be the same or different duplication component utilized for the first host process 402, for creating a copy of the second host application 418 and its associated settings) and employed in the second isolated environment 424.

The second host process 416 is also associated with a second host broker component 428 that facilitates the communication of specific messages between the second host process 416 and the second isolated environment 424. The second broker component 428 provides communications isolation between potential malware associated with the second untrusted data 422 of the second isolated environment 424 and operations associated with the second host process 416. Message authentication can be performed by the second broker component 428 to ensure that only trustworthy messaging will be processed by the second host process 416.

In other words, a host process can create multiple isolated environments each hosting its own separate piece of untrusted content. The multiple isolated environments can further be isolated from each other (and not just isolated from the host and rest of the computer); however, this can be an implementation detail, since one isolation environment need not be designed to be isolated from another isolated environment when processing associated untrusted data.

The data handling system 400 also includes the client system desktop 208 for presenting normal views of trusted data and protected views of untrusted data. Here, several types of views can be presented: a first normal view 430 (similar to window 304 of FIG. 3) of the first trusted data 406 (via the first host application 404), a first protected view 432 (similar to window 306 of FIG. 3) of the first untrusted data 408 (via the first host application 404), a second normal view 434 (similar to window 304 of FIG. 3) of the second trusted data 420 (via the second host application 418), and a second protected view 436 (similar to window 306 of FIG. 3) of the second untrusted data 422 (via the second host application 418).

Alternatively, it can be the case where a single broker component can be employed to handle the communications between all host processes (e.g., first host process 402 and second host process 416) and isolated environments (e.g., first isolated environment 410 and second isolated environment 424) rather than each process having its own broker component.

As before, the host processes and isolated environments can all be located on the same client system. Alternatively, the host process can be located remote from the client-side isolated environments. Still alternatively, the first host process 402 can be located remotely, while the second host process 416, first isolated environment 410, and second isolated environment 424 are located on the client system.

The views 438, since all based on the same type of application (e.g., word processor) can be presented in windows that from the perspective of the user appear to all be from the same application or process. In another implementation, the views 438 can be in separate windows according to the data (e.g., $Data_1$, $Data_2$) or in separate windows according to trusted and untrusted, for example.

Figure 5:
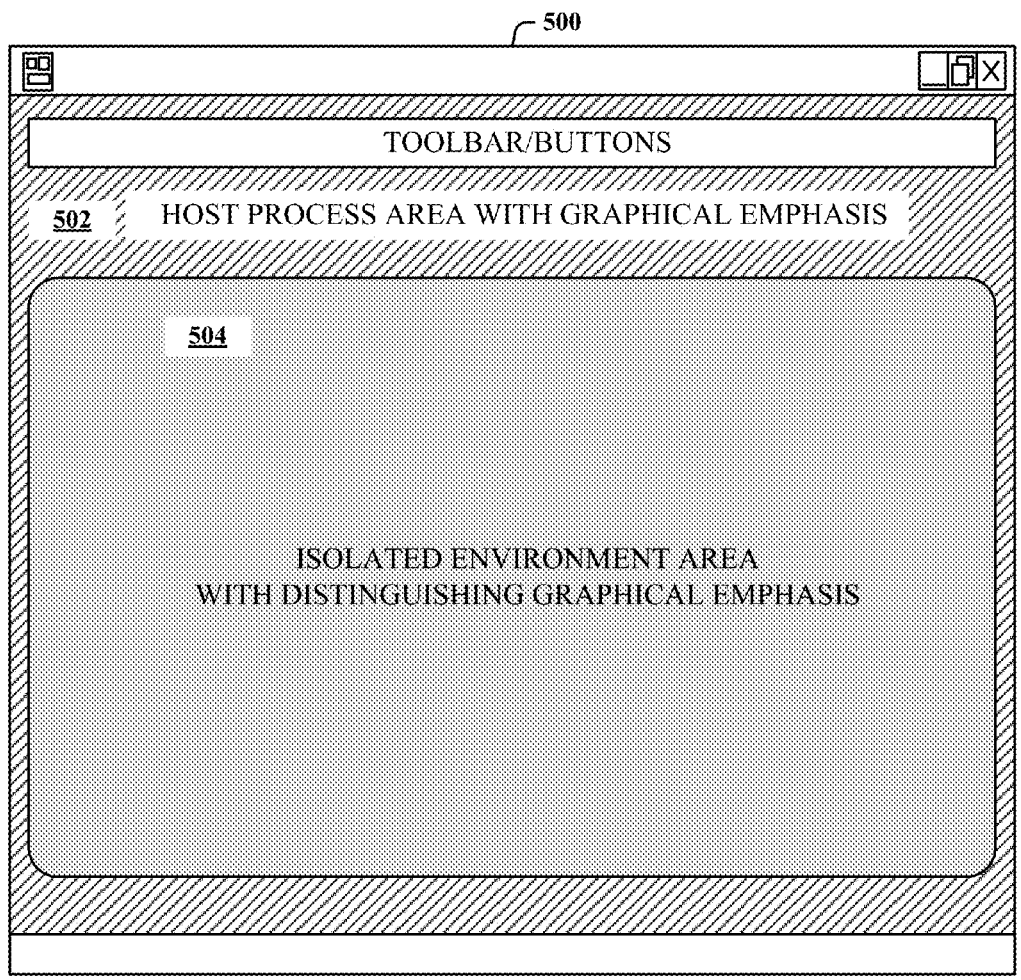
FIG. 5 illustrates an exemplary user interface for a protected view of untrusted data.

FIG. 5 illustrates an exemplary user interface 500 for a protected view of untrusted data. The host area 502 (denoted in crosshatching for illustrations purposes only) denotes the host process. Any user actions such as button clicks, toolbar clicks, etc., in the host area 502 are deemed authenticated and do not generate a confirmation dialog to which the user will need to respond. Contrariwise, in the isolated area 504 (denoted in gray for illustrations purposes only), all user gestures from the process are considered unauthenticated and can trigger a confirmation dialog to which the user will respond. The client system shows two running host processes of the application.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
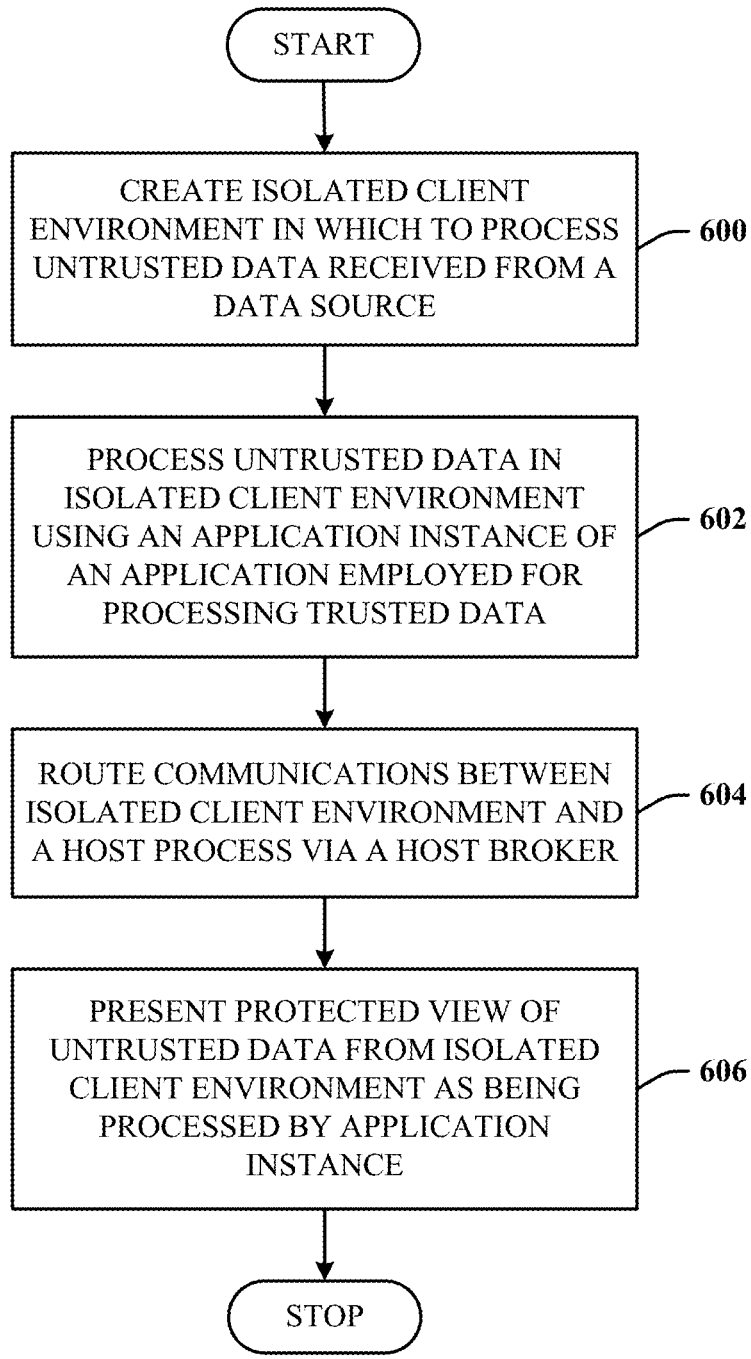
FIG. 6 illustrates a computer-implemented method of handling data.

FIG. 6 illustrates a computer-implemented method of handling data. At 600, an isolated client environment is created in which to process untrusted data received from a data source. The isolated client environment can be created in direct response to an indication that the data received is untrusted. It can also be the scenario that determination is not based on the data itself but an untrusted data source, domain, network, etc. At 602, the untrusted data is processed in the isolated client environment using an application instance of an application employed for processing trusted data. For example, a word processing application employed as a trusted host process is duplicated for use in the isolated client environment to run the untrusted data (e.g., file, code, instructions, programs, etc.).

At 604, communications between the isolated client environment and a host process is routed via a host broker. The host broker can be a program (e.g., DLL (dynamic link library)). At 606, a protected view of the untrusted data is presented from the isolated client environment as being processed by the application instance.

Figure 7:
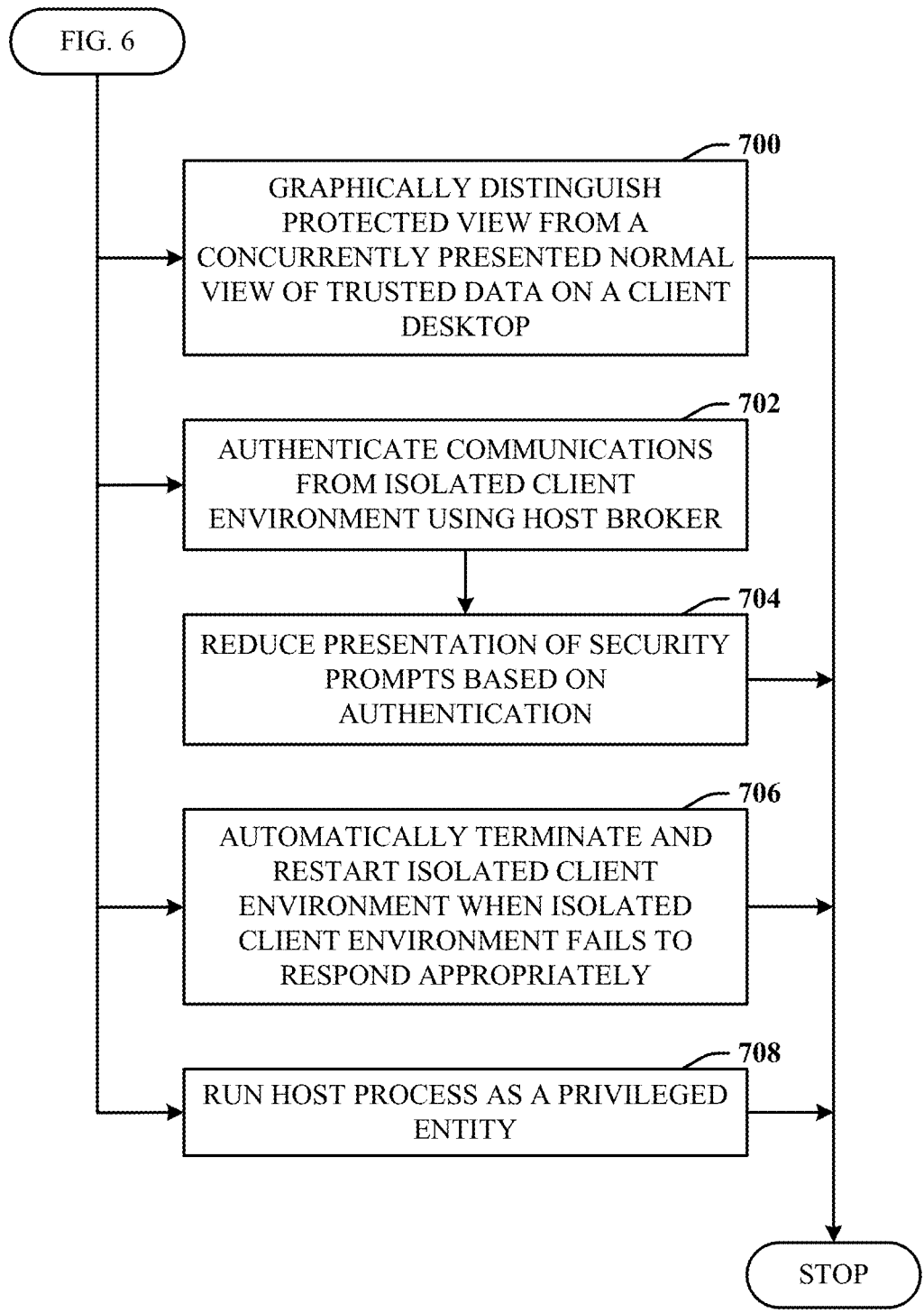
FIG. 7 illustrates additional aspects of the method described in FIG. 6.

FIG. 7 illustrates additional aspects of the method described in FIG. 6. At 700, the protected view is graphically distinguished from a concurrently presented normal view of the trusted data on a client desktop. In other words, the user interface can present a normal view of trusted data (e.g., files) be run by an application and the protected view of the untrusted data being run by the application instance. This occurs seamlessly to the client user, but to ensure the user knows which view is trusted or untrusted, graphical emphasis (e.g., window colors, border coloring, text notifications, window background coloring, etc.) can be applied to the protected view.

The untrusted data can be an untrusted file opened in the isolated client environment using the application instance and presented via the protected view. At 702, communications from the isolated client environment is authenticated using the host broker. At 704, the presentation of security prompts is reduced based on the authentication. At 706, the isolated client environment is automatically terminated and restarted when the isolated client environment fails to respond appropriately. This can be due to the untrusted data causing abnormal behavior of the application instance such that the isolated environment locks up, for example. Alternatively, this can be due to initial appropriate behavior of the application instance changing because of malware impacting normal operation the application instance. At 708, the host process is run as a privileged entity.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
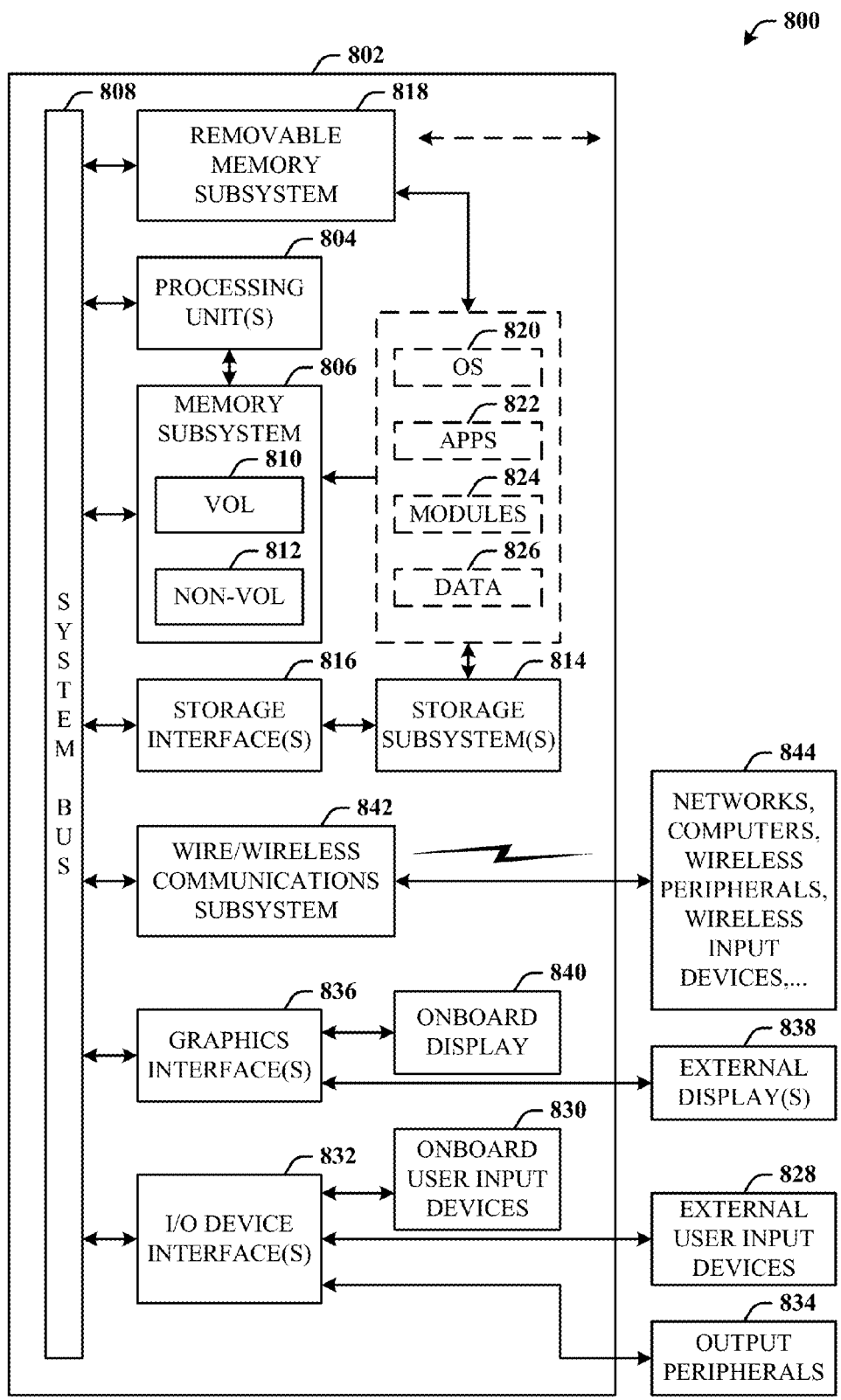
FIG. 8 illustrates a block diagram of a computing system operable to execute isolated data handling and viewing in accordance with the disclosed architecture.

Referring now to FIG. 8, there is illustrated a block diagram of a computing system 800 operable to execute isolated data handling and viewing in accordance with the disclosed architecture. In order to provide additional context for various aspects thereof, FIG. 8 and the following discussion are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include one or more of the following: the components and entities of system 100 of FIG. 1, the components and entities of system 200 of FIG. 2, the components and entities of system 300 of FIG. 3, the components and entities of system 400 of FIG. 4, the user interface 500 and, the method and steps of FIGS. 6-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile media, removable and non-removable media. For the computer 802, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 9:
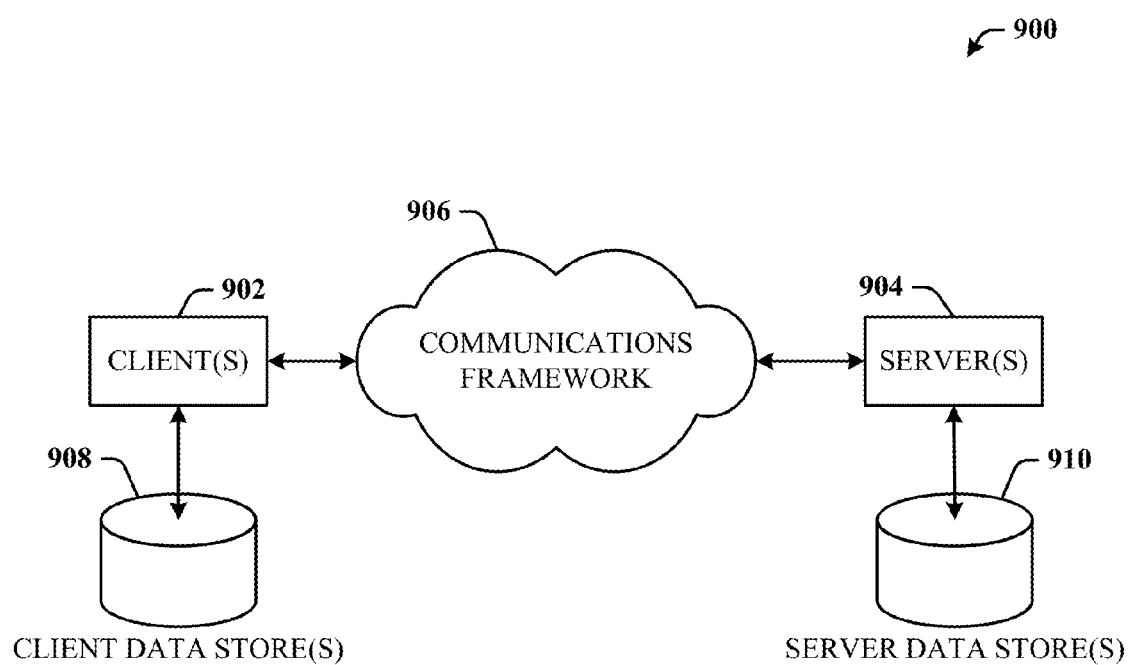
FIG. 9 illustrates a schematic block diagram of a computing environment that supports client-based data processing of untrusted data.

Referring now to FIG. 9, there is illustrated a schematic block diagram of a computing environment 900 that supports client-based data processing of untrusted data. For example, the computing environment 900 can include the isolated client process and a remote host process (e.g., a server-based process, or another client-based host process) for communicating with the isolated client process for authentication and isolation from other client processes.

The environment 900 includes one or more client(s) 902. The client(s) 902 can be hardware and/or software (e.g., threads, processes, computing devices). The client(s) 902 can house cookie(s) and/or associated contextual information, for example. The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for processing untrusted data, the system comprising:
   a processor; and
   a memory in communication with the processor, the memory having computer-readable instructions stored thereupon that, when executed by the processor, cause the processor to perform a method comprising
   performing a schema check on data received from a data source to determine that the data received comprises the untrusted data, the schema check indicating that the data received is corrupted;
   determining that the data received comprises trusted data by determining that a user has previously chosen to edit the data received;
   creating an isolated client environment in which to process the untrusted data in response to determining that the data received comprises untrusted data;
   processing the untrusted data in the isolated client environment using an application instance of an application, the application being configured to process trusted data;
   routing communications between the isolated client environment and a host process via a host broker; and
   presenting a protected view and a normal view within a user interface, the protected view comprising a view of the untrusted data from the isolated client environment, and the normal view comprising a view of the trusted data processed by the application.

2. The system of claim 1, wherein the protected view is graphically distinguishable from the normal view.

3. The system of claim 1, wherein the untrusted data comprises an untrusted file opened in the isolated client environment using the application instance and presented via the protected view.

4. The system of claim 1, wherein the method further comprises authenticating communications from the isolated client environment using the host broker.

5. The system of claim 4, wherein presenting the protected view comprises presenting the protected view without generating a security prompt.

6. The system of claim 1, wherein the method further comprises terminating and restarting the isolated client environment in response to determining that the isolated client has failed to respond appropriately.

7. The system of claim 1, wherein the method further comprises executing the host process as a privileged entity.

8. A system for processing untrusted data, the system comprising:
   a processor; and
   a memory in communication with the processor, the memory having computer-readable instructions stored thereupon that, when executed by the processor, cause the processor to perform a method comprising
   performing a virus scan on data received from a data source to determine that the data received comprises the untrusted data;
   determining that the data received comprises trusted data by determining that a user has previously chosen to edit the data received;
   in response to determining that the data received comprises untrusted data, create an isolated client environment in which to process the untrusted data received from a data source;
   processing the untrusted data in the isolated client environment using an application instance of an application, the application being configured to process the trusted data;
   routing communications between the isolated client environment and a host process via a host broker; and
   presenting a view comprising a protected view and a normal view, the protected view comprising a view of the untrusted data from the isolated client environment, and the normal view comprising a view of the trusted data processed by the application.

9. The system of claim 8, wherein the view comprises a user interface concurrently presenting the protected view and the normal view, wherein the protected view is graphically distinguishable from the normal view within the user interface, wherein the host process is configured to authenticate messages from within the protected view prior to processing, and wherein the host process is configured to treat messages from within the normal view as authenticated.

10. The system of claim 8, wherein the untrusted data comprises an untrusted file opened in the isolated client environment using the application instance and presented via the protected view.

11. The system of claim 8, wherein the method further comprises authenticating communications from the isolated client environment using the host broker.

12. The system of claim 8, wherein the method further comprises terminating and restarting the isolated client environment in response to determining that the isolated client has failed to respond appropriately.

13. The system of claim 8, wherein the method further comprises executing the host process as a privileged entity.

14. The system of claim 8, wherein the untrusted data comprises data received from an untrusted data source in communication with the computer.

15. The system of claim 8, wherein the untrusted data comprises data formatted in a file format designated by the computer as an untrusted file format.

16. A computer-implemented method of processing untrusted data, the, computer-implemented method comprising: performing a virus scan on data received from a data source to determine that the data received comprises the untrusted data;
   determining that the data received comprises trusted data by determining that a user has previously chosen to edit the data received;
   in response to determining that the data received comprises untrusted data, creating an isolated client environment in which to process the untrusted data received from a data source;
   processing the untrusted data in the isolated client environment using an application instance of an application, the application being configured to process the trusted data;
   routing communications between the isolated client environment and a host process via a host broker; and
   presenting a view comprising a protected view and a normal view, the protected view comprising a view of the untrusted data from the isolated client environment, and the normal view comprising a view of the trusted data processed by the application.

17. The method of claim 16, wherein the view comprises a user interface concurrently presenting the protected view and the normal view, wherein the protected view is graphically distinguishable from the normal view within the user interface, wherein the host process is configured to authenticate messages from within the protected view prior to processing, and wherein the host process is configured to treat messages from within the normal view as authenticated.

18. The method of claim 16, wherein the untrusted data comprises an untrusted file opened in the isolated client environment using the application instance and presented via the protected view.

19. The method of claim 16, further comprising, authenticating communications from the isolated client environment using the host broker.

20. The method of claim 16, further comprising, terminating and restarting the isolated client environment in response to determining that the isolated client has failed to respond appropriately.

21. The method of claim 16, further comprising, executing the host process as a privileged entity.

22. The method of claim 16, wherein the untrusted data comprises data received from an untrusted data source in communication with the computer.

23. The method of claim 16, wherein the untrusted data comprises data formatted in a file format designated by the computer as an untrusted file format.

\* \* \* \* \*